(12) United States Patent
Chen

(10) Patent No.: US 6,246,838 B1
(45) Date of Patent: Jun. 12, 2001

(54) PHOTOGRAPHIC CAMERA HAVING ADDITIONAL IMAGE

(76) Inventor: Chao Lin Chen, 14F-2, No. 337, Da Yia Road, Taichung (TW), 406

( * ) Notice: Subject to any disclaimer, the term of this patent is extended or adjusted under 35 U.S.C. 154(b) by 0 days.

(21) Appl. No.: 09/447,249

(22) Filed: Nov. 23, 1999

(51) Int. Cl.⁷ .......................... G03B 17/24; G03B 41/00; G03B 11/00
(52) U.S. Cl. .......................... 396/316; 396/322; 396/544
(58) Field of Search .................... 396/316, 322, 396/544, 6, 337, 319, 535

(56) References Cited

U.S. PATENT DOCUMENTS

| | | | |
|---|---|---|---|
| 1,396,035 | * 11/1921 | Gaisman | 396/316 |
| 3,665,828 | * 5/1972 | Reiter | 396/322 |
| 3,896,463 | * 7/1975 | Laskey | 396/544 |
| 3,916,423 | * 10/1975 | Ueda et al. | 396/316 |
| 3,940,775 | * 2/1976 | Bodnar | 396/544 |
| 4,342,510 | * 8/1982 | Guilluame | 396/511 |
| 5,126,773 | 6/1992 | Ono et al. | 396/316 |

* cited by examiner

Primary Examiner—D. Rutledge
(74) Attorney, Agent, or Firm—Charles E. Baxley, Esq.

(57) ABSTRACT

A camera includes a casing having an optical device disposed in the front portion and a film disposed in the rear portion. One or more image sheets are detachably securing to the middle portion of the casing and between the film and the optical device by magnetic members. The magnetic members of the casing or the magnetic members of the image sheets are different from each other for checking the image sheets at the correct position. The casing includes a window having an additional image sheet for checking whether the image sheets are at the correct position.

13 Claims, 4 Drawing Sheets

PHOTOGRAPHIC CAMERA HAVING ADDITIONAL IMAGE

BACKGROUND OF THE INVENTION

1. Field of the Invention

The present invention relates to a camera, and more particularly to a photographic camera having an additional and detachable image, such as letter or picture.

2. Description of the Prior Art

U.S. Pat. No. 5,126,773 to Ono et al. discloses a typical photographic camera capable of incorporating additional image, such as a letter, a picture, an illustration or the like. One or more additional image sheets may be provided and secured in the camera, but have no devices for allowing the additional image sheets to be disengaged from the camera such that the camera may not be replaced with the other image sheets. In addition, no devices are provided for locating the image sheets.

The present invention has arisen to mitigate and/or obviate the afore-described disadvantages of the conventional additional images for the cameras.

SUMMARY OF THE INVENTION

The primary objective of the present invention is to provide a photographic camera including one or more additional image sheets that may be detachably attached to the camera and that may be replaced with each other.

The other objective of the present invention is to provide a photographic camera including a positioning or locating device for positioning the additional image sheets and for preventing the image sheets from being disposed upside-down.

In accordance with one aspect of the invention, there is provided a camera comprising a casing including a rear portion and a front portion and a middle portion, an optical assembly disposed in the front portion of the casing, a film disposed in the rear portion of the casing, at least one first image sheet, and means for magnetically securing the first image sheet in the middle portion of the casing and between the film and the optical assembly.

The magnetically securing means includes a first magnetic device provided in the casing, and a second magnetic device provided in the first image sheet for engaging with the first magnetic device and for detachably attaching the first image sheet to the casing. The first magnetic device includes one or more first magnetic members, the second magnetic device includes one or more second magnetic members having magnetic poles different from that of the first magnetic members for acting with the first magnetic members.

A checking means is further provided for checking a position of the first image sheet. The casing includes a window provided in the front portion thereof, the checking means includes a second image sheet engaged in the window corresponding to the first image sheet disposed in the middle portion of the casing for checking the first image sheet at a correct position. A screen piece is preferably detachably provided between the film and the first image sheet.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
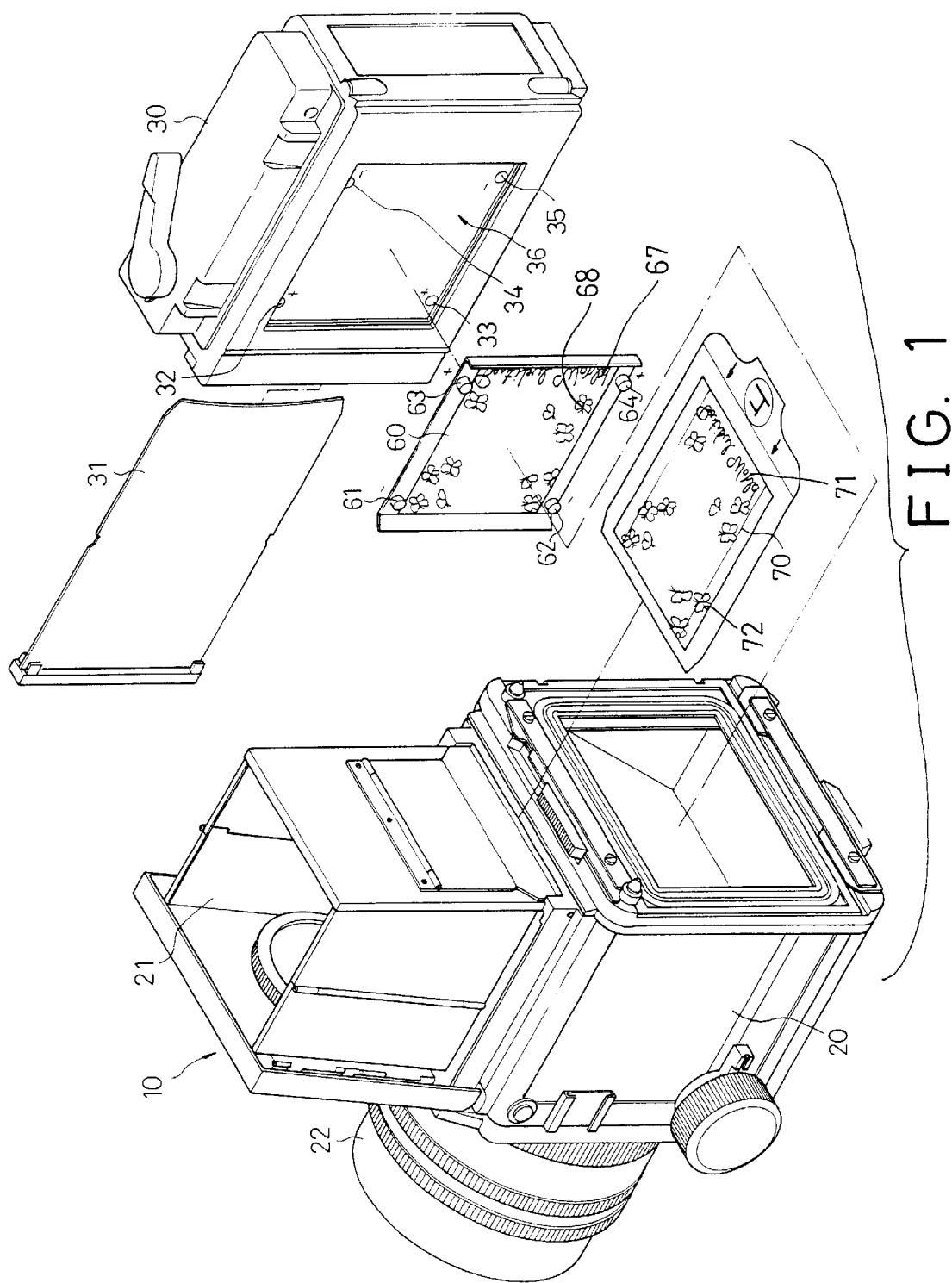
FIG. 1 is an exploded view of a photographic camera in accordance with the present invention.
Figure 2:
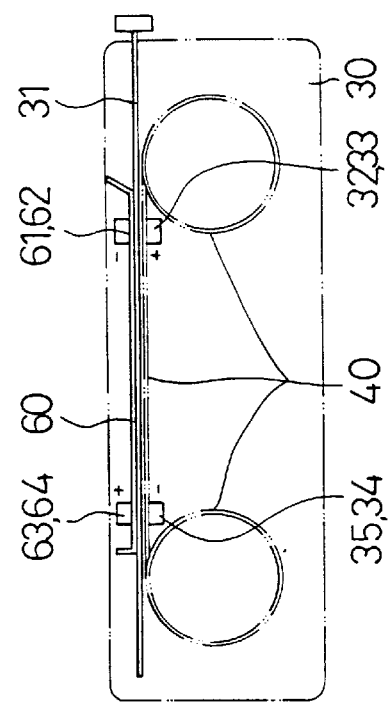
FIG. 2 is a partial top schematic view of the 15 photographic camera.
Figure 3:
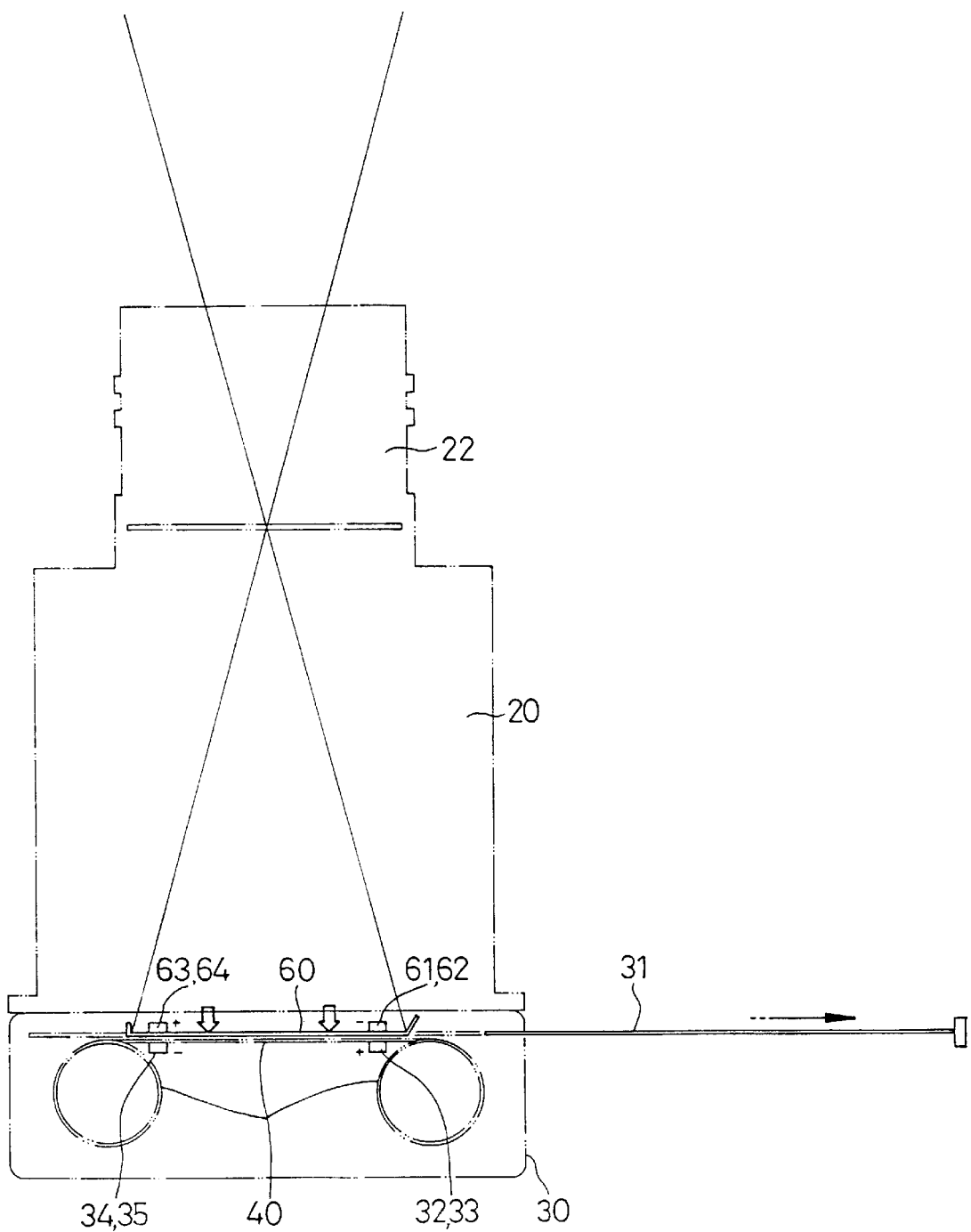
FIG. 3 is a top schematic view of the photographic camera.

Referring to the drawings, and initially to FIGS. 1–3, a photographic camera in accordance with the present invention comprises a casing 10 including a front housing 20 and a rear housing 30 which may be formed as an integral casing or which may be detachably secured together. The camera includes a conventional optical assembly 22 having one or more lenses and a shutter and the like for forming an image of a photographed subject on a film 40. The casing 10, particularly the rear housing 30 includes an opening 36 formed therein and preferably formed in the front portion of the rear housing 30 and formed between the front housing 20 and the rear housing 30. Or relatively, the opening 36 is formed between the film 40 and the optical assembly 22. The film 40 is an image recording medium, such as a photographic film in a rolled form, and includes an instant film in a sheet form and the like located in the rear housing 30 and aligned with the opening 36 of the casing 10. The casing 10 may further include a window 21 for viewing the image to be taken. The window 21 is preferably provided on top of the front housing 20.

The casing 10 includes one or more magnets or magnetic members 32, 33, 34, 35 provided and secured therein, particularly secured in the rear housing 30 and preferably disposed close to the corner areas of the opening 36 of the casing 10. The instant sheet form film 40 is preferably located in front of the magnets or the magnetic members 32–35. One or more additional image sheets 60, 65, 66 (FIG. 5) each includes one or more magnets or magnetic members 61, 62, 63, 64 provided and secured thereon and preferably disposed close to the corner areas thereof for engaging with or for acting with the magnets or magnetic members 32–35 and for detachably securing the additional image sheets 60, 65, 66 to the rear housing 30 of the casing 10 and for positioning the additional image sheets 60, 65, 66 between the instant sheet form film 40 and the optical assembly 22. A screen piece 31 may further be provided and engaged between the film 40 and the additional image sheets 60, 65, 66 before taking the photos. The casing 10 may include a partition, such as a partition frame provided between the film 40 and the additional image sheets 60, 65, 66 or between the magnets 32–35 and 61–64 for preventing the film 40 and/or the additional image sheets 60, 65, 66 from being damaged.

It is to be noted that the casing 10 may include one or more portions thereof magnetized, instead of the magnets or the magnetic members 32–35, for engaging with the magnets or the magnetic members 61–64 of the additional image sheets 60, 65, 66 and for detachably securing the additional image sheets 60, 65, 66 between the film 40 and the optical assembly 22. Or, the additional image sheets 60, 65, 66 may each include one or more portions thereof magnetized, instead of the magnets or the magnetic members 61–64, for engaging with the magnets or the magnetic members 32–35 of the casing 10 and for detachably securing the additional image sheets 60, 65, 66 between the film 40 and the optical assembly 22. Or, the casing 10 may include one or more portions thereof made of materials that may be attracted by the magnetic members, such as the metal or the steel and the like, for engaging with the magnets or the magnetic members 61–64 or the magnetized portions of the additional image sheets 60, 65, 66 for detachably securing the additional image sheets 60, 65, 66 between the film 40 and the optical assembly 22. Or, alternatively, the additional image sheets 60, 65, 66 may each include one or more portions thereof made of materials that may be attracted by the magnetic members, such as the metal or the steel and the like, for engaging with the magnets or the magnetic members 32–35 or the magnetized portions of the casing 10 and for detachably securing the additional image sheets 60, 65, 66 between the film 40 and the optical assembly 22. The magnets or the magnetic members 32–35, 61–64, and/or the magnetized portions of the casing 10 or of the image sheets 60, 65, 66 and the materials of the casing 10 and the image sheets 60, 65, 66 that may be attracted by the magnets may all be considered as or called as the magnetic members or magnetic devices.

Figure 4:
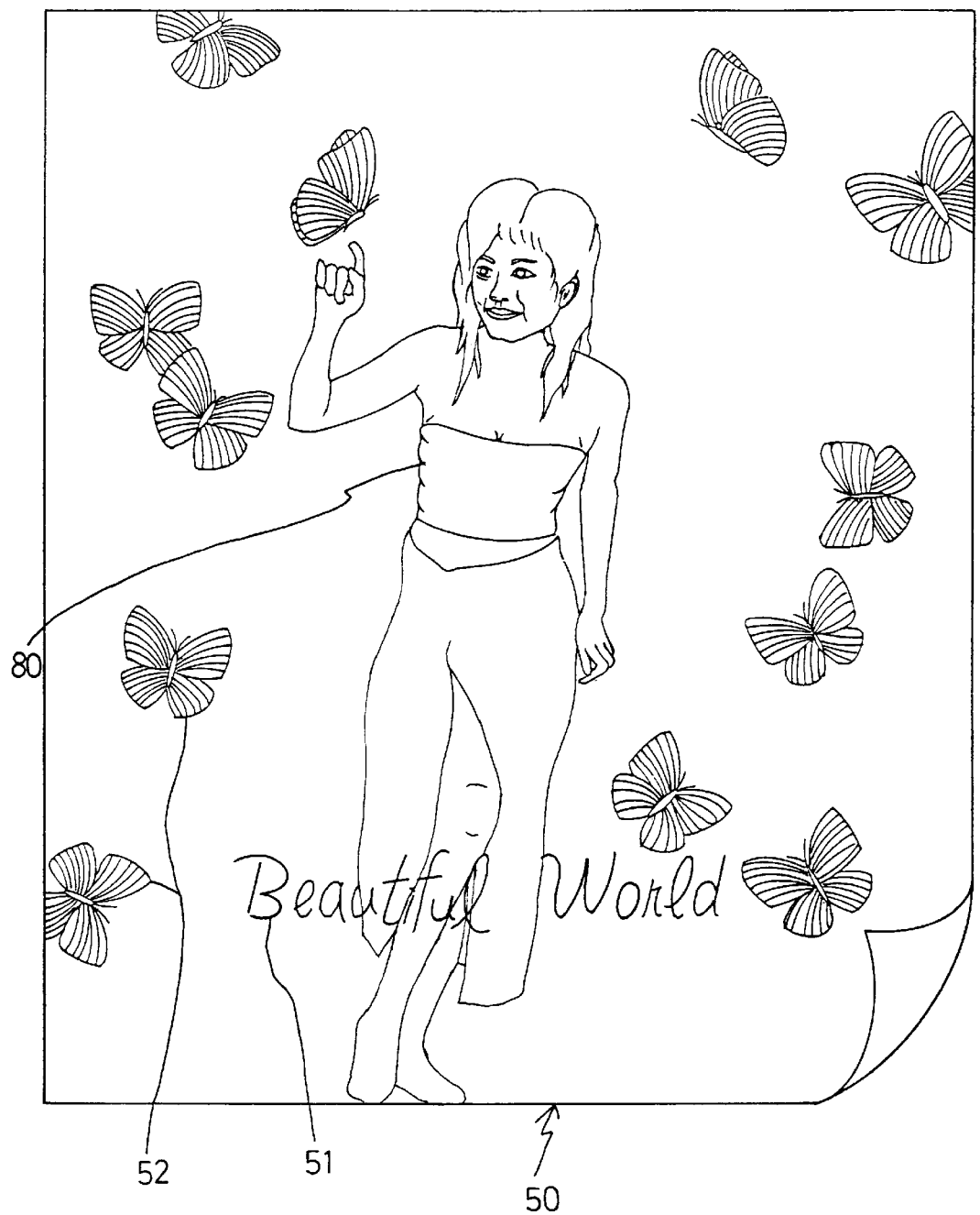
FIG. 4 is a plane view of a photo taken by the photographic camera with the additional image sheet.

Referring to FIGS. 1 and 4, the additional image sheet 60 include one or more image patterns having such as the letters 67 and/or the patterns 68 provided thereon for forming the corresponding patterns 67, 68 on the film 40 which may then be developed and formed on the photo 50 as the patterns 51, 52 respectively. The subject to be photographed may also be formed into the film 40 and then developed into the photographed subject 80 in the photo 50. A further image sheet 70 may be provided in the window 21 of the casing 10 for checking whether the image sheet 60 is disposed in the right position or in the right direction. For example, when the image sheet 60 is disposed upside-down, the patterns 67, 68 of the image sheet 60 will not coincide with the patterns 71, 72 of the image sheet 70. The users may then change the position or the direction of the image sheet 60.

Referring again to FIGS. 1–3, one or more of the magnets or the magnetic members 32–35 preferably include different magnetic pole from that of the other of the magnets or the magnetic members 32–35.

Similarly, one or more of the magnets or the magnetic members 61–64 preferably include different magnetic pole from that of the other of the magnets or the magnetic members 61–64. In addition, the magnets or the magnetic members 32–35 of the casing 10 include a magnetic pole different from that of the corresponding magnets or the magnetic members 61–64 for allowing the image sheet 60 to be correctly attached onto the casing 10, particularly the rear housing 30 at the right position. The image sheet 60 may not be attached onto the casing 10 when the image sheet 60 is disposed upside-down or the like due to the wrongly arranged magnets or magnetic members.

Figure 5:
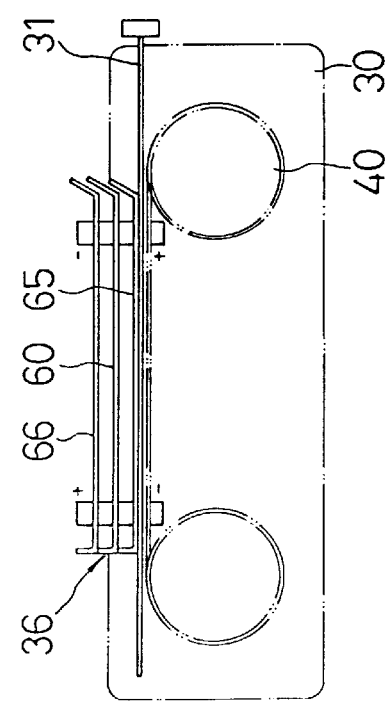
FIG. 5 is a partial top schematic view of the photographic camera similar to FIG. 2, illustrating the further application of the photographic camera.

As shown in FIG. 5, one or more image sheets 60, 65, 66 may either or all be attached onto the casing 10 with the detachable magnetic members, for providing one or more layers of the images provided in the image sheets 60, 65, 66 and for allowing the images provided in the image sheets 60, 65, 66 to be all formed and developed in the photo 50 (FIG. 4).

Accordingly, the photographic camera in accordance with the present invention includes one or more additional image sheets that may be detachably attached to the camera and that may be replaced with each other, and includes a positioning or locating device for positioning the additional image sheets and for preventing the image sheets from being disposed upside-down or disposed in the wrong position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A camera comprising:
   a casing including a rear portion and a front portion,
   an optical assembly disposed in said front portion of said casing,
   a film disposed in said rear portion of said casing,
   at least one first image sheet, and
   means for detachably attaching said at least one first image sheet in said casing and between said film and said optical assembly, said detachably attaching means including a first magnetic device provided in said casing, and a second magnetic device provided in said at least one first image sheet for engaging with said first magnetic device and for detachably attaching said at least one first image sheet to said casing.

2. The camera according to claim 1, wherein said first magnetic device includes at least one first magnetic member having a magnetic pole, said second magnetic device includes at least one second magnetic member having a magnetic pole different from that of said at least one first magnetic member for acting with said at least one second magnetic member.

3. The camera according to claim 1, wherein said first magnetic device includes at least two first magnetic members having magnetic poles different from each other, said second magnetic device includes at least two second magnetic members having magnetic poles different from that of said at least two first magnetic members for acting with said at least two first magnetic members, said magnetic poles of said at least two second magnetic members are different from each other.

4. The camera according to claim 1 further comprising means for checking a position of said at least one first image sheet.

5. The camera according to claim 4, wherein said casing includes a window provided in said front portion thereof, said checking means includes a second image sheet engaged in said window corresponding to said at least one first image sheet disposed in said casing for checking said at least one first image sheet at a correct position.

6. The camera according to claim 1 further comprising a screen piece detachably provided between said film and said at least one first image sheet.

7. A camera comprising:
   a casing including a rear portion and a front portion and a middle portion,
   an optical assembly disposed in said front portion of said casing,
   a film disposed in said rear portion of said casing,
   at least one first image sheet, and
   means for magnetically securing said at least one first image sheet in said casing and between said film and said optical assembly.

8. The camera according to claim 7, wherein said magnetically securing means includes a first magnetic device provided in said casing, and a second magnetic device provided in said at least one first image sheet for engaging with said first magnetic device and for detachably attaching said at least one first image sheet to said casing.

9. The camera according to claim 8, wherein said first magnetic device includes at least one first magnetic member having a magnetic pole, said second magnetic device includes at least one second magnetic member having a magnetic pole different from that of said at least one first magnetic member for acting with said at least one second magnetic member.

10. The camera according to claim 8, wherein said first magnetic device includes at least two first magnetic members having magnetic poles different from each other, said second magnetic device includes at least two second magnetic members having magnetic poled different from that of said at least two first magnetic members for acting with said at least two first magnetic members, said magnetic poles of said at least two second magnetic members are different from each other.

11. The camera according to claim 7 further comprising means for checking a position of said at least one first image sheet.

12. The camera according to claim 11, wherein said casing includes a window provided in said front portion thereof, said checking means includes a second image sheet engaged in said window corresponding to said at least one first image sheet disposed in of said casing for checking said at least one first image sheet at a correct position.

13. The camera according to claim 7 further comprising a screen piece detachably provided between said film and said at least one first image sheet.

* * * * *